United States Patent
Xie et al.

(10) Patent No.: US 11,366,765 B1
(45) Date of Patent: Jun. 21, 2022

(54) OPTIMIZE METADATA MANAGEMENT TO BOOST OVERALL SYSTEM PERFORMANCE

(71) Applicant: International Business Machines Corporation, Armonk, NY (US)

(72) Inventors: Qiang Xie, Shanghai (CN); Hui Zhang, Shanghai (CN); Hong Qing Zhou, Shanghai (CN); Yongjie Gong, Shanghai (CN); Ping Hp He, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/236,325

(22) Filed: Apr. 21, 2021

(51) Int. Cl.
| | |
|---|---|
| *G06F 12/00* | (2006.01) |
| *G06F 13/00* | (2006.01) |
| *G06F 13/28* | (2006.01) |
| *G06F 12/123* | (2016.01) |
| *G06F 9/50* | (2006.01) |
| *G06F 16/14* | (2019.01) |

(52) U.S. Cl.
CPC .......... *G06F 12/124* (2013.01); *G06F 9/5016* (2013.01); *G06F 16/14* (2019.01); *G06F 2212/1021* (2013.01); *G06F 2212/1044* (2013.01)

(58) Field of Classification Search
CPC ................. G06F 12/124; G06F 9/0516; G06F 2212/1021; G06F 2212/1044; G06F 16/14
USPC ......................................................... 711/136
See application file for complete search history.

(56) References Cited

U.S. PATENT DOCUMENTS

| | | | |
|---|---|---|---|
| 8,402,205 B2 | 3/2013 | Goss | |
| 8,868,831 B2 | 10/2014 | Goyal | |
| 9,098,542 B2 | 8/2015 | Prahlad | |
| 10,223,368 B2 | 3/2019 | Bhosale | |
| 2012/0089782 A1* | 4/2012 | McKean | G06F 12/0866 711/E12.024 |
| 2012/0173824 A1 | 7/2012 | Iyigun | |
| 2016/0026406 A1* | 1/2016 | Hahn | G06F 12/0246 711/103 |

(Continued)

OTHER PUBLICATIONS

Disclosed Anonymously, et al, "Method and System to Improve Host Side Caching When Used With Multi Tier Storage Environments", IP.com, Jun. 7, 2018, 9pps., <https://priorart.ip.com/IPCOM/000254183>.

(Continued)

*Primary Examiner* — Edward J Dudek, Jr.
*Assistant Examiner* — Sidney Li
(74) *Attorney, Agent, or Firm* — Gilbert Harmon, Jr.

(57) ABSTRACT

In an approach to optimizing metadata management to boost overall system performance, a cache for a storage system is initialized. Responsive to receiving a cache hit from a host cache during a host I/O operation, a first metadata of a plurality of metadata is transferred to a storage cache, where the first metadata is associated with a user data from the host I/O operation, and further wherein the first metadata is deleted from the host cache. Responsive to determining that the storage cache is full, a second metadata of the plurality of metadata is destaged from the storage cache, where the second metadata is destaged by moving the second metadata to the host cache, and further wherein the second metadata is deleted from the storage cache.

20 Claims, 7 Drawing Sheets

(56) References Cited

U.S. PATENT DOCUMENTS

2020/0293447 A1    9/2020   Gupta

OTHER PUBLICATIONS

Disclosed Anonymously, et al, "Minimizing the Costly Update of Persistent Meta-data in Multi-tier Environment by Using Metadata Filter", IP.com, Nov. 24, 2015, 9 pps., <https://priorart.ip.com/IPCOM/000244214>.

Song, N. Y., et al, "Optimizing of Metadata Management in Large-Scale File Systems", Jun. 5, 2018, 15 pps., Springer Science+Business Media, LLC., <https://www.researchgate.net/publication/325982529_Optimizing_of_metadata_management_in_large-scale_file_systems>.

Xue, W., "Dynamic Hashing: Adaptive Metadata Management for Petabyte-scale File Systems", Jan. 2006, 7 pps., Department of Computer Science and Technology, Tsinghua University, China, <https://www.researchgate.net/publication/228552610_Dynamic_Hashing_AdaptiveMetadata_Management_for_Petabyte-scale_File_Systems>.

\* cited by examiner

OPTIMIZE METADATA MANAGEMENT TO BOOST OVERALL SYSTEM PERFORMANCE

BACKGROUND

The present invention relates generally to the field of computer resource allocation, and more particularly to optimizing metadata management to boost overall system performance.

Metadata means "data about data". Metadata is defined as the data providing information about one or more aspects of the data; it is used to summarize basic information about data which can make tracking and working with specific data easier. Metadata describes other data. It provides information about a certain item's content. For example, an image may include metadata that describes how large the picture is, the color depth, the image resolution, when the image was created, and other data. A text document's metadata may contain information about how long the document is, who the author is, when the document was written, and a short summary of the document. Other examples of metadata include purpose of the data, process used to create the data, and location on a computer network where the data is stored. Metadata can be stored and managed in a database, often called a metadata registry or metadata repository.

In computing, a cache is a hardware or software component that stores data so that future requests for that data can be served faster; the data stored in a cache might be the result of an earlier computation or a copy of data stored elsewhere. A cache hit occurs when the requested data can be found in a cache, while a cache miss occurs when it cannot. Cache hits are served by reading data from the cache, which is faster than recomputing a result or reading from a slower data store; thus, the more requests that can be served from the cache, the faster the system performs.

In a storage system, a cache may hold metadata which may include directory contents, file status information (e.g., time, size, and permission bits), and file system structures. The metadata allows for fast access to the underlying data.

SUMMARY

Embodiments of the present invention disclose a method, a computer program product, and a system for optimizing metadata management to boost overall system performance. In one embodiment, a cache for a storage system is initialized. Responsive to receiving a cache hit from a host cache during a host I/O operation, a first metadata of a plurality of metadata is transferred to a storage cache, where the first metadata is associated with a user data from the host I/O operation, and further wherein the first metadata is deleted from the host cache. Responsive to determining that the storage cache is full, a second metadata of the plurality of metadata is destaged from the storage cache, where the second metadata is destaged by moving the second metadata to the host cache, and further wherein the second metadata is deleted from the storage cache.

DETAILED DESCRIPTION

Figure 1:
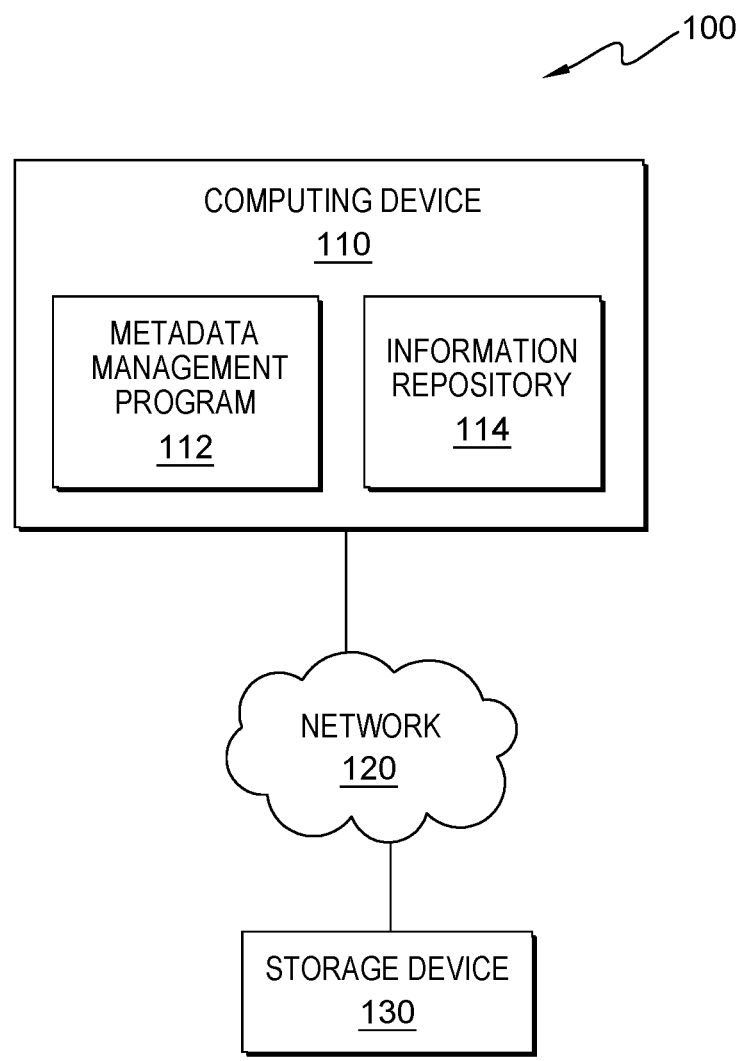
FIG. 1 is a functional block diagram illustrating a distributed data processing environment, in accordance with an embodiment of the present invention.

Metadata access rate is key for system performance. Slow metadata access causes slow user data access and performance issues. In a typical storage system, the limited cache space cannot hold all the metadata for all the hot user data.

Metadata access rate in cache is the key element for storage performance, and even system performance. Slow metadata access causes slow access to user data and performance issues. When a storage system is shared by many hosts, virtual machines, and containers, the limited cache space in storage cannot hold all the metadata for user data from all these resources. For example, 10 gigabytes (GB) of user data requires 16 megabyte (MB) of metadata; 1 petabyte (PB) of user data requires approximately 1.6 terabytes (TB) of metadata. A typical high-end storage system may contain only 2 TB of cache, most of which is allocated to the actual user data cache, and only a portion of the 2 TB of cache is allocated to metadata. Therefore, in a storage system the amount of metadata can quickly exceed the cache capacity allocated to metadata. This leads to a storage system bottleneck caused by slow access to metadata, which must be read prior to the user data because the metadata typically holds the location of the user data in the back-end storage.

In one example of a real-world storage system, the volume read/write operations always need to first read track metadata to locate the target track of the user data. This typical storage system occasionally hits a performance issue with an I/O spike which causes thousands of I/O timeouts. The root cause was traced to one write accessing metadata while it was not in the cache, but instead was located on an overdriven rank. In another example, in a cloud environment where thousands of virtual machines are deployed, the storage cache is a bottleneck for overall performance. This is an example of a storage system that has the user data in high performance storage ranks, but the metadata for the user data in low performance ranks. Since the storage system must first retrieve the metadata to locate the user data, performance suffers retrieving the metadata from the low performance storage ranks.

The present invention provides a solution to the performance issues associated with slow metadata access. The present invention is a computer implemented method, computer program product, and system to optimize metadata management to boost overall system performance, by utilizing parts of spare host cache to collaborate with storage cache to manage the combined caches together. The invention selects and preload metadata into either the host cache or the storage cache and use a hash algorithm to accelerate metadata access in both caches, and to swap metadata between the caches. When a host I/O operation causes a cache hit on metadata in the host cache, the metadata is deleted and sent to the storage cache. When metadata is destaged from the storage cache, it is pushed to the host cache for fast future access. The invention will also manage metadata in different tiers in the storage side, where the temperature (i.e., hot, warm, or cold, in descending order of priority) of metadata is based on the user data, as well as by machine learning analysis of the user data. Metadata with a higher temperature is stored in a more efficient tier.

The present invention greatly improves metadata management to boost overall system performance. Slow metadata access caused by limited storage cache is avoided; the management of metadata cache between the host cache and the storage cache breaks the storage cache size limitation. Cache space is always dynamically expanded or reduced according to connected numbers of hosts. Metadata on the back-end disks is well distributed on different tiers. Users will also experience cost savings over expanding storage cache by using a part of the existing spare host cache.

The present invention provides both host- and storage-side metadata management, including cache reservation and a module to map a user data track index to metadata. When the storage system is initialized to run, the invention will preload metadata of high QoS volumes, if any, to the storage cache, and when the host attaches, metadata of the host is preloaded into the host cache from the top tier, and then, based on the amount of allocated cache space, from the lower tiers as well.

When a host performs an I/O operation to the storage system, the invention first checks for a cache hit on the metadata in the host cache. If there is a cache hit, the host I/O and metadata is transferred to the storage cache, and the metadata is then removed from the host cache. When metadata is destaged from storage cache due to limited cache, it is pushed to host cache for faster access later. In this way, there is only one copy of metadata either in host side cache or storage side cache at any time.

The metadata of hotter user data stored on the top tier is stored on the top tier as well. The invention may use machine learning or system learning to determine the temperature of the user data on an ongoing basis, constantly adjusting the metadata by swapping the hot/warm/cold metadata for optimum storage system performance. In addition, the invention will promote the metadata of a volume to the top tier if the user data on the volume is all on the top tier. As many other metadata as possible are kept on the top tier as well.

Metadata can be managed in different granularity. In the backend array, an array may be divided into many "extents" and each extent may be used to store metadata or customer data. The promote/demote/swap between the backend storage, the storage cache, and the host cache is managed in "extent" granularity. But in the cache, the metadata is managed in "track" granularity which is usually smaller than "extent". For example, 1 metadata extent may equal 2000 metadata tracks. For the purposes of this invention, both metadata and meta extents refer to the same metadata, and only differ in the granularity. It should be understood that the terms metadata and meta extents may be used interchangeably.

FIG. 1 is a functional block diagram illustrating a distributed data processing environment, generally designated 100, suitable for operation of metadata management program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes metadata management program 112. In an embodiment, metadata management program 112 is a program, application, or subprogram of a larger program for optimizing metadata management to boost overall system performance. In an alternative embodiment, metadata management program 112 may be located on any other device accessible by computing device 110 via network 120.

In an embodiment, computing device 110 includes information repository 114. In an embodiment, information repository 114 may be managed by metadata management program 112. In an alternate embodiment, information repository 114 may be managed by the operating system of the device, alone, or together with, metadata management program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, user data, user data metadata, host cache data, storage cache data, storage tier data, machine learning data, configuration data, and other data that is received by metadata management program 112 from one or more sources, and data that is created by metadata management program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, a NoSQL database, an object-oriented database, or one or more tables.

Distributed data processing environment 100 includes storage device 130 connected to network 120. Storage device 130 is the storage system for computing device 110. In an embodiment, storage device 130 is connected to computing device 110 via network 120. In another embodiment, storage device 130 is directly connected to computing device 110. In yet another embodiment, storage device 130 is operatively connected to computing device 110 by any means as would be known to one skilled in the art.

In an embodiment, storage device 130 is a tiered storage system. In an embodiment, storage device 130 includes, but is not limited to, one or more hot, or top tiers, one or more warm, or middle tiers, and one or more cold, or lower tiers, where the tiers are prioritized from hot tiers, which contain the most frequently used data, to the cold tiers, which contain the least frequently used data. In an embodiment, storage device 130 may include any number of tiers to optimize the storage of data for distributed data processing environment 100.

Figure 3:
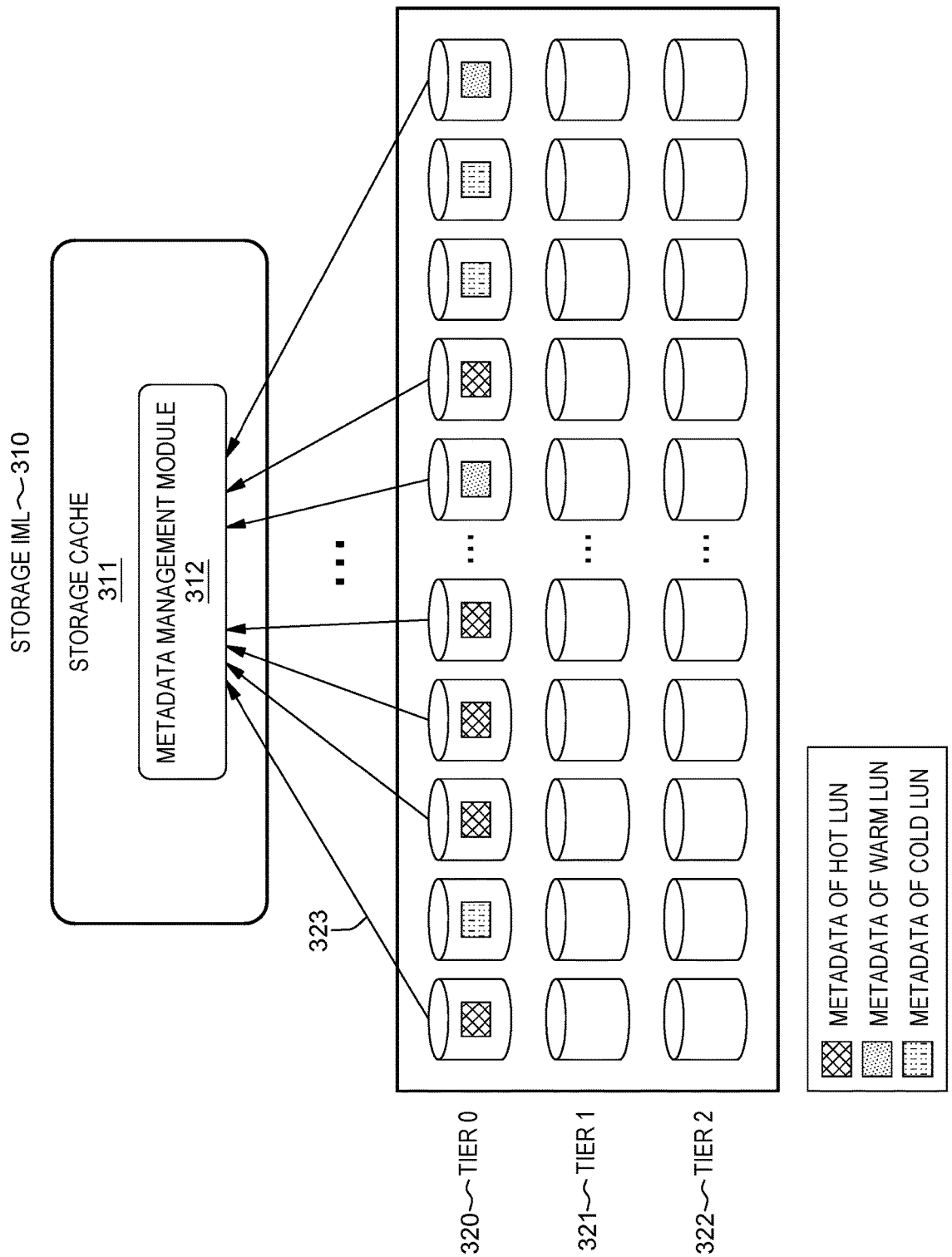
FIG. 3 is an example of preloading the metadata of high Quality of Service (QoS) volumes to the storage cache, in accordance with an embodiment of the present invention.

In an embodiment, storage device 130 is tiered according to performance. In an embodiment, storage device 130 may include storage tier 0, storage tier 1, and storage tier 2, where tier 0 is the fastest (and highest cost) storage tier and tier 2 is the slowest (and lowest cost) storage tier. In another embodiment, storage device 130 may include any number of storage tiers. An example of a storage system tiered by performance is shown in FIG. 3 below.

Figure 2:
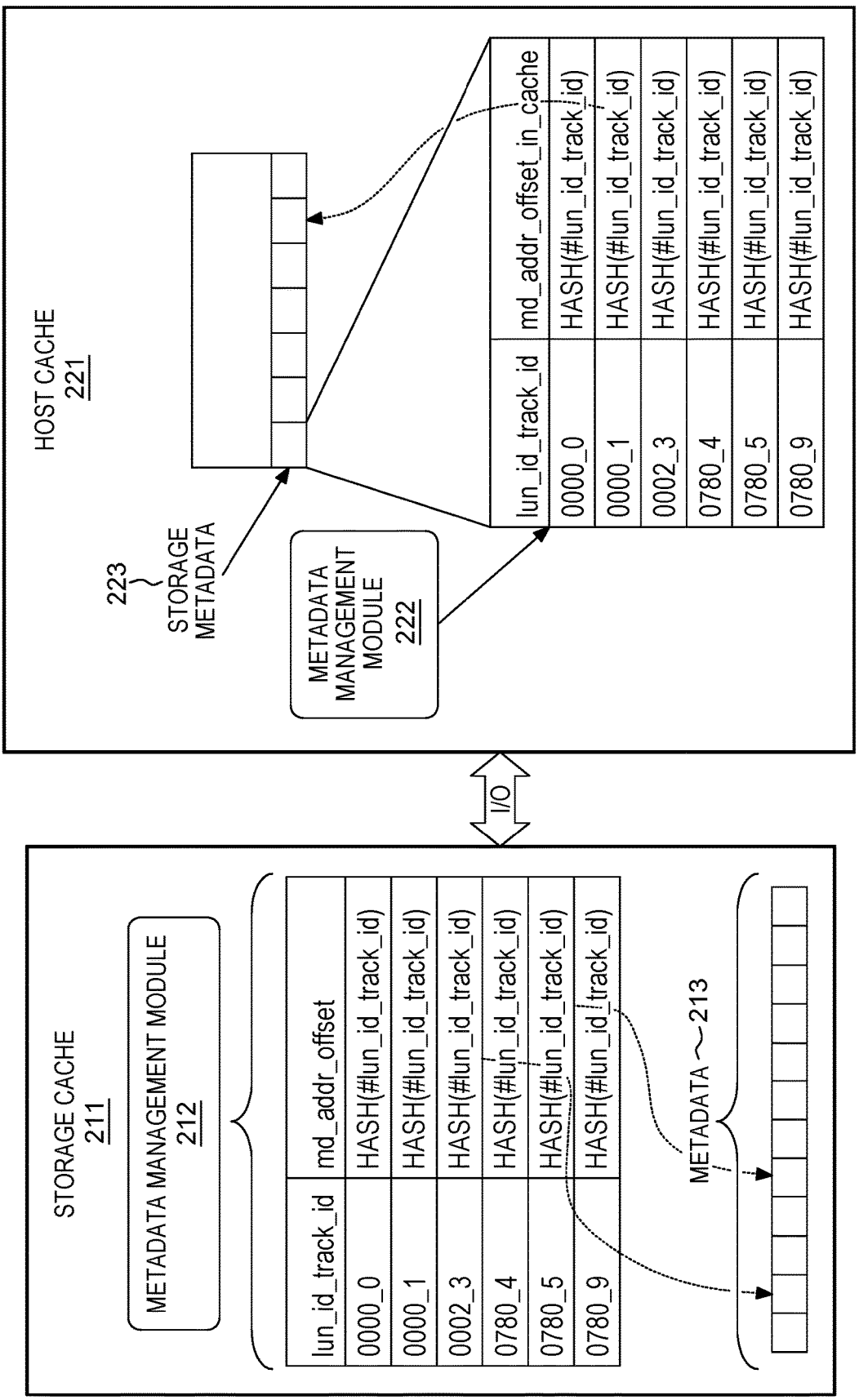
FIG. 2 is an example of initial metadata management for host cache and storage cache reservation and a module to map data track indices to the metadata, in accordance with an embodiment of the present invention.

FIG. 2 is an example of initial metadata management for host cache and storage cache reservation and a module to map data track indices to the metadata, in accordance with an embodiment of the present invention. In this example, the metadata management consists of two main parts. First, storage Initial Machine Load (IML) 210 is an example of the initial configuration of the storage cache for caching metadata. Second, host server 220 is an example of the cache on the host.

Storage IML 210 includes storage cache 211, which is an example of the initial configuration of the storage cache for reserving cache space for the storage metadata. Storage cache 211 includes metadata management module 212 and metadata 213. Metadata management module 212 is an example of a look-up table to locate metadata in the storage-side cache. In this example, the table consists of two fields, the lun_id_track_id (logical unit number identification track identification), and the md_addr_offset_in_cache (metadata address offset in the cache). The lun_id_track_id is the logical unit and track on which the actual data is stored. The md_addr_offset_in_cache is a hash of the lun_id_track_id that is a pointer to the metadata associated with the actual data. Metadata 213 is an example of the metadata associated with the actual data that is stored in the cache.

Host server 220 includes host cache 221, which is an example of the initial configuration of the host cache for reserving cache space for the storage metadata. Host cache 221 includes metadata management module 222, which has the same functionality as metadata management module 212, and storage metadata 223, which is an example of the metadata associated with the actual data that is uploaded from the storage cache and stored in the host cache.

In an embodiment, metadata management module 212 and metadata management module 222 are one module. In another embodiment, metadata management module 212 and metadata management module 222 are separate modules that metadata management program 112 uses together to manage the metadata for the storage system, e.g., storage device 130 from FIG. 1.

Metadata is used by the storage system when performing I/O operations on the user data. There must be a copy of metadata in backend storage arrays. When an I/O request arrives the backend storage system, the backend storage system will fetch the metadata first according to the lun_id_track_id of the user data. Metadata and user data are treated equally by the backend storage, so they are stored in the data extents. These extents are managed and moved by the storage system according to their usage (hot or cold).

During initialization of the storage system, metadata management program 112 fetches the metadata from the backend storage arrays and stores it into the storage cache prior to operating on the real user data. Because the storage system is shared by many hosts, the storage cache has metadata for different hosts. These metadata are saved in metadata 213. First, the metadata is copied from backend storage array into metadata 213 in storage cache 211. Once the I/O operations begin, the metadata are moved between metadata 213 on the storage side, and metadata 223 on the host side.

FIG. 3 is an example of preloading the metadata of high QoS volumes to the storage cache, in accordance with an embodiment of the present invention. The procedure illustrated in FIG. 3 takes place during initialization of the storage system, typically after the initialization shown in the example of FIG. 2.

In this example, storage IML 310 is an example of storage IML 210 from FIG. 2. As in the example of FIG. 2 above, storage IML 310 contains storage cache 311, an example of storage cache 211 from FIG. 2, and metadata management module 312, an example of metadata management module 212 from FIG. 2.

In this example, the storage system also includes storage tier 0 320, storage tier 1 321, and storage tier 2 322. Storage tier 0 320 through storage tier 2 322 are examples of storage tiers in the storage system, where tier 0 is the fastest (and highest cost) storage tier and tier 2 is the slowest (and lowest cost) storage tier. Arrows 323 indicate that the metadata from the hot and warm Logical Unit Numbers (LUNs) in tier 0 are being preloaded into the storage cache.

In the example shown in FIG. 3, only the metadata from hot and warm LUNs on tier 0 320 are uploaded to the storage cache. In actual operation, however, the metadata from the top to the bottom tiers needs to be uploaded to storage cache first, and when the storage cache allocated to metadata is full, then to host cache. If the host cache reservation for the metadata is large enough, then metadata management program 112 will load all the hot, warm, and cold metadata to the host cache. If the host cache reservation for the metadata is not large enough, then metadata management program 112 will load based on the order of hot/warm/cold LUNs until the allocated cache space is full.

Generally speaking, the storage cache allocation is not large enough to store all the metadata from the hot/warm/cold LUNs, since the storage cache is shared by many hosts. The total amount of metadata can be huge, and most of the cache is allocated for customer data. In the example of FIG. 3, only metadata on tier 0 is selected, which is the hottest tier. But if the size of the storage cache is large enough, then metadata management program 112 will preload more metadata from warm and/or cold tiers.

In some embodiments, tier 0 320 contains the hot extents, tier 1 321 has the warm extents, and tier 2 322 has the cold extents. As explained above, if the data for a specific host is warm or cold from the view of the storage system, its data may be in tier 1 321 or tier 2 322, but in the present invention, metadata management program 112 will copy the metadata for the data for the specific host from the backend storage array to the storage cache, and then metadata management program 112 will move the metadata from the storage cache to the host cache for the specific host.

In an embodiment, the storage cache is used by all the hosts in the system. But data for a specific host may not be hot from the view of the storage system, and therefore the data is stored in warm or cold tiers. In this case, the metadata for the specific host can be copied from backend storage arrays to the storage cache, and then moved from the storage cache to host cache of the specific host.

Figure 4:
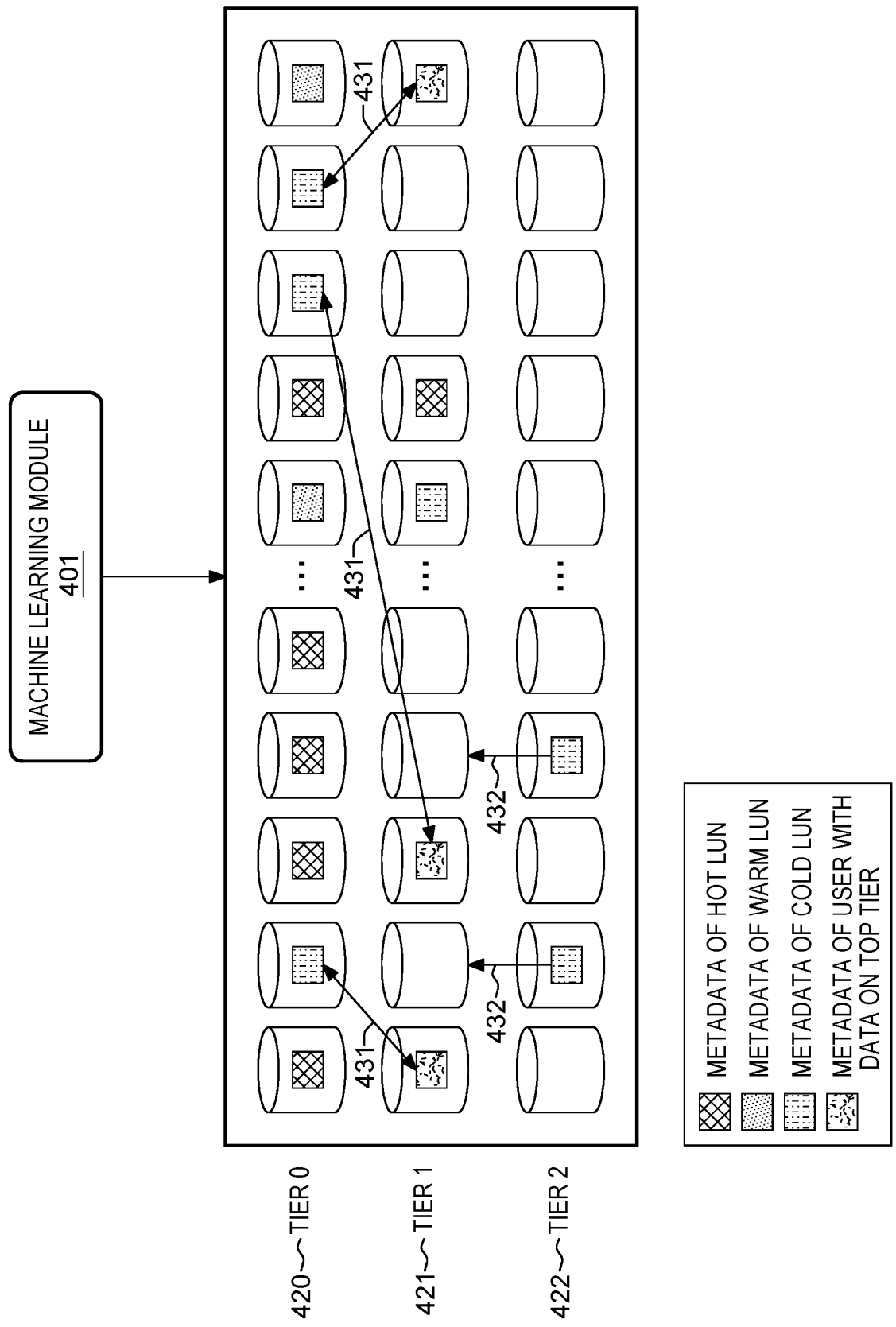
FIG. 4 is an example of moving the metadata of hotter data to the top tier based on machine learning or system learning, in accordance with an embodiment of the present invention.

FIG. 4 is an example of moving the metadata of hotter data to the top tier based on machine learning or system learning, in accordance with an embodiment of the present invention. FIG. 4 includes Machine Learning module (ML module) 401, which is the machine learning module of metadata management program 112 that learns the usage patterns and relationships of the data in the storage system, e.g., storage device 130 from FIG. 1.

In an embodiment, ML module 401 learns the usage patterns and relationships of the data in the storage system from the disk Input/Output Operations Per Second (IOPS), the I/O size, and the I/O response time. In an embodiment, ML module 401 then clusters the data into hot, warm, and cold groups based on these factors.

Storage tier 0 420, storage tier 1 421, and storage tier 2 422 are examples of storage tiers in the storage system, where tier 0 is the fastest (and highest cost) storage tier and tier 2 is the slowest (and lowest cost) storage tier. These are, for example, storage tier 0 320, storage tier 1 321, and storage tier 2 322 from FIG. 3.

Arrows 431 illustrate metadata being exchanged between lower tiers of the back-end storage to the top tier of the back-end storage based on the results of ML module 401 of metadata management program 112. In an embodiment, metadata management program 112 promotes metadata to the top tier if the user data on the volume is all on the top tier. For example, if one meta extent contains metadata for N user extents, and all the N user extents are stored on the top tier, then metadata management program 112 promotes the one meta extent that is on a lower tier to the top tier. In an embodiment, metadata management program 112 promotes as many metadata to the top tier as possible, based on the available storage on the top tier. In this example, the metadata from a lower tier for users with all data stored in the top tier is swapped with the metadata of cold LUNs on the upper tier.

Arrows 432 illustrate metadata being promoted from lower tiers to the higher tiers based on available space in the higher tier. In an embodiment, metadata management program 112 promotes metadata to higher tiers based on the results of ML module 401 when there is space available in the higher tiers. In this example, the metadata of two cold LUNs are promoted from tier 2 422 to tier 1 421 since there is space available in tier 1 421.

Figure 5:
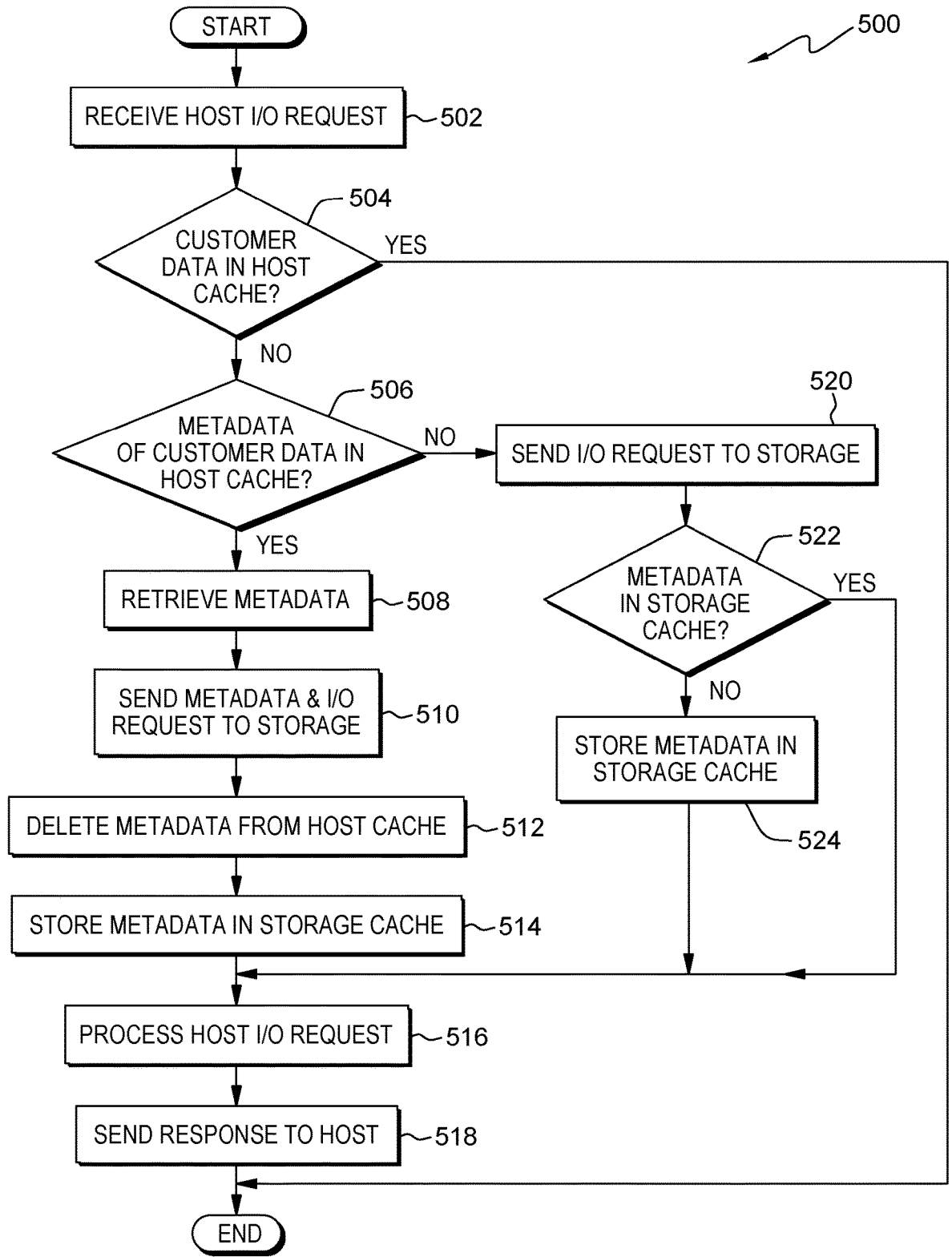
FIG. 5 is a flowchart depicting operational steps for the metadata host cache to storage cache procedure performed by metadata management program 112 to migrate metadata to the storage cache, on a computing device within the distributed data processing environment of FIG. 1, for optimizing metadata management to boost overall system performance, in accordance with an embodiment of the present invention.

FIG. 5 is a flowchart depicting operational steps for the metadata host cache to storage cache procedure performed by metadata management program 112 to migrate metadata to the storage cache, on a computing device within the distributed data processing environment of FIG. 1, for optimizing metadata management to boost overall system performance, in accordance with an embodiment of the present invention. In an alternative embodiment, the steps of workflow 500 may be performed by any other program while working with metadata management program 112.

In an embodiment, metadata management program 112 receives a host I/O request from the host. In an embodiment, metadata management program 112 determines if the user data for the host I/O request is already in the host cache. In an embodiment, metadata management program 112 determines whether the metadata of the user data is located in the host cache or the storage cache. In an embodiment, if metadata management program 112 determines that the metadata of the user data is located in the host cache, then metadata management program 112 retrieves the metadata from the host. In an embodiment, metadata management program 112 sends the metadata retrieved from the host and an I/O request to the storage. In an embodiment, metadata management program 112 deletes the metadata for the user data from the host cache. In an embodiment, metadata management program 112 checks the metadata received from the host cache to determine if the metadata is already in the storage cache. In an embodiment, metadata management program 112 uses the metadata to locate the user data from the storage system and processes the host I/O request. In an embodiment, metadata management program 112 sends the retrieved data and an acknowledgment to the host. In an embodiment, metadata management program 112 then ends for this cycle. In an embodiment, if the metadata of the user data is not in the host cache, then metadata management program 112 sends an I/O request to the storage. In an embodiment, metadata management program 112 determines if the metadata for the requested user data is in the storage cache. In an embodiment, metadata management program 112 reads the metadata from the backend array and stores the metadata in the storage cache. In an embodiment, metadata management program 112 then processes the host I/O request.

It should be appreciated that embodiments of the present invention provide at least for optimizing metadata management to boost overall system performance. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 5 illustrates one possible iteration of the metadata host cache to storage cache procedure performed by metadata management program 112 to migrate metadata to the storage cache, which repeats each time a host I/O request is received.

Metadata management program 112 receives a host I/O request (step 502). In an embodiment, metadata management program 112 receives a host I/O request from the host, e.g., computing device 110 from FIG. 1.

Metadata management program 112 determines if the user data is in the host cache (decision block 504). In an embodiment, metadata management program 112 determines if the user data for the host I/O request is already in the host cache. If the data that the host is requesting is already cached in the host, there is no need for the storage system to respond with the data. Therefore, in an embodiment, if metadata management program 112 determines that the user data for the host I/O request is already in the host cache ("yes" branch, decision block 504), then metadata management program 112 ends for this cycle. In an embodiment, if metadata management program 112 determines that the user data for the host I/O request is not already in the host cache ("no" branch, decision block 504), then metadata management program 112 proceeds to decision block 506.

Metadata management program 112 determines if the metadata of the user data is in the host cache (decision block 506). In an embodiment, metadata management program 112 determines whether the metadata of the user data is located in the host cache or the storage cache. This step ensures that the system will only store one copy of the metadata in cache, either in the storage cache or the host cache. In an embodiment, if metadata management program 112 determines that the metadata of the user data is located in the host cache ("yes" branch, decision block 506), then metadata management program 112 proceeds to step 508 to retrieve the metadata. In an embodiment, if metadata management program 112 determines that the metadata of the user data is not located in the host cache ("no" branch, decision block 506), then metadata management program 112 proceeds to step 520 to send the I/O request to the storage system.

Metadata management program 112 retrieves the metadata (step 508). In an embodiment, if metadata management program 112 determines that the metadata of the user data is located in the host cache, then metadata management program 112 retrieves the metadata from the host. In an embodiment, metadata management program 112 has direct access to the host cache and retrieves the metadata from the host directly. In another embodiment, metadata management program 112 retrieves the metadata from the host by sending a request to the host to send the metadata. In yet another embodiment, metadata management program 112 retrieves the metadata from the host using any method as would be known to a person having skill in the art.

Metadata management program 112 sends the metadata & an I/O request to the storage (step 510). In an embodiment, metadata management program 112 sends the metadata retrieved from the host in step 508 and an I/O request to the storage system. In an embodiment, metadata management program 112 uses a least recently used (LRU) algorithm for storing metadata in the storage cache. In an embodiment, the LRU algorithm stores the most recently used metadata in the fastest storage, and if the fastest storage is full, metadata is removed from the fastest storage starting with the least recently used metadata. In an embodiment, the storage cache is the fastest storage for the metadata since it is directly connected to the storage back-end. The next fastest storage is the host cache, since the metadata is still in cache, but must be retrieved from the host by the storage. The slowest storage for the metadata is the back-end storage, since this is typically disk or tape storage, which is typically very slow compared to the cache which is typically RAM.

Figure 6:
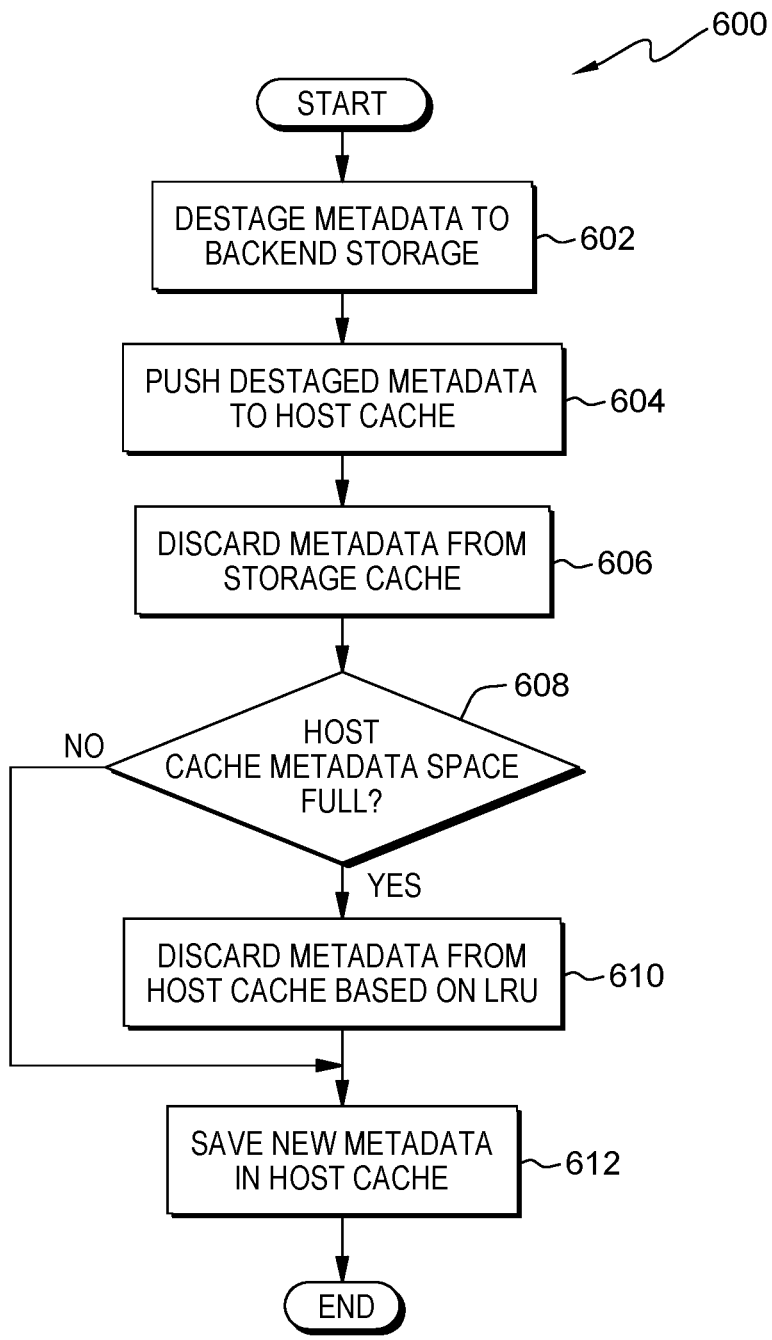
FIG. 6 is a flowchart depicting operational steps for the storage cache destaging procedure performed by metadata management program 112 whenever the storage cache cannot hold new metadata, on a computing device within the distributed data processing environment of FIG. 1, for optimizing metadata management to boost overall system performance, in accordance with an embodiment of the present invention.

Since this is a new host I/O request, and since the metadata for this host I/O request was found in the host cache, according to the LRU algorithm metadata management program 112 will relocate the metadata from the host cache to the storage cache. If the storage cache is already full, then metadata management program 112 will destage metadata from the storage cache. The procedure for destaging metadata from the storage cache is shown in FIG. 6 below.

Metadata management program 112 deletes the metadata from the host cache (step 512). In an embodiment, metadata management program 112 deletes the metadata for the user data from the host cache. In this way, metadata management program 112 ensures that the metadata resides in only one cache at a time, to optimize the use of the cache, since storing the metadata in more than one cache at a time reduces the overall available cache storage for metadata.

Metadata management program 112 stores the metadata in the storage cache (step 514). In an embodiment, metadata management program 112 checks the metadata received from the host cache to determine if the metadata is already in the storage cache. In an embodiment, if metadata management program 112 determines that the metadata is not already in the storage cache, then metadata management program 112 stores the metadata for the user data in the storage cache. This completes the relocation of the metadata from the host cache to the storage cache.

Metadata management program 112 processes the host I/O request (step 516). In an embodiment, metadata management program 112 uses the metadata to locate the user data from the storage system and processes the host I/O request. In an embodiment, once metadata management program 112 locates the user data in the storage system, metadata management program 112 retrieves the data for the host.

Metadata management program 112 sends a response to the host (step 518). In an embodiment, metadata management program 112 sends the retrieved data and an acknowledgment to the host. In an embodiment, metadata management program 112 then ends for this cycle.

Metadata management program 112 Sends an I/O request to the storage (step 520). In an embodiment, if the metadata of the user data is not in the host cache ("no" branch, decision block 506), then metadata management program 112 sends an I/O request to the storage.

Metadata management program 112 determines if the metadata is in the storage cache (decision block 522). In an embodiment, metadata management program 112 determines if the metadata for the requested user data is in the storage cache. In an embodiment, if metadata management program 112 determines that the metadata for the requested user data is in the storage cache ("yes" branch, decision block 522), then metadata management program 112 proceeds to step 516 to process the I/O request. In an embodiment, if metadata management program 112 determines that the metadata for the requested user data is not in the storage cache ("no" branch, decision block 522), then metadata management program 112 proceeds to step 524 to store the metadata in the storage cache.

Metadata management program 112 stores the metadata in the storage cache (step 524). Since the metadata for the user data requested by the host was not found in either the host cache or the storage cache, and since this data was just requested, according to the LRU algorithm this metadata should be stored in the storage cache. Therefore, in an embodiment, metadata management program 112 reads the metadata from the backend array and stores the metadata in the storage cache. In an embodiment, metadata management program 112 then proceeds to step 516 to process the host I/O request.

FIG. 6 is a flowchart depicting operational steps for the storage cache destaging procedure performed by metadata management program 112 whenever the storage cache cannot hold new metadata, on a computing device within the distributed data processing environment of FIG. 1, for optimizing metadata management to boost overall system performance, in accordance with an embodiment of the present invention. In an alternative embodiment, the steps of workflow 600 may be performed by any other program while working with metadata management program 112.

In an embodiment, when the storage cache is full, metadata management program 112 destages the metadata to the backend disk to ensure the data is persistent/hardened on the disk so the metadata can be preloaded/used in the future when needed. In an embodiment, metadata management program 112 pushes the destaged metadata to the host cache. In an embodiment, once the metadata has been pushed to the host cache, metadata management program 112 discards the metadata from the storage cache. This step frees space in the storage cache for new metadata. In an embodiment, metadata management program 112 determines whether the space allocated in the host cache for metadata is full. In an embodiment, metadata management program 112 discards existing metadata from the host cache using the LRU algorithm to create space for the new metadata. In an embodiment, metadata management program 112 saves the new metadata in the host cache. In an embodiment, metadata management program 112 then ends for this cycle.

It should be appreciated that embodiments of the present invention provide at least for optimizing metadata management to boost overall system performance. However, FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 6 illustrates one possible iteration of the storage cache destaging procedure performed by metadata management program 112, which repeats whenever the storage cache cannot hold new metadata.

Metadata management program 112 destages the metadata to the backend storage (step 602). In an embodiment, when the storage cache is full, metadata management program 112 destages the metadata to the backend disk to ensure the data is persistent/hardened on the disk so the metadata can be preloaded/used in the future when needed. Once the metadata is pushed to the host cache, the metadata is kept in both the disk and the host cache. In an embodiment, metadata management program 112 uses the LRU algorithm to determine which metadata to destage.

Metadata management program 112 pushes the destaged metadata to the host cache (step 604). In an embodiment, metadata management program 112 pushes the destaged metadata to the host cache. In an embodiment, metadata management program 112 directly accesses the host cache to push the metadata. In another embodiment, metadata management program 112 sends the metadata to the host with a request for the host to add the data to the host cache. In yet another embodiment, metadata management program 112 may push the metadata to the host using any method as would be known to one skilled in the art.

Metadata management program 112 discards the metadata from the storage cache (step 606). In an embodiment, once the metadata has been pushed to the host cache, metadata management program 112 discards the metadata from the storage cache. This step frees space in the storage cache for new metadata.

Metadata management program 112 determines if the host cache metadata space is full (decision block 608). In an embodiment, metadata management program 112 determines whether the space allocated in the host cache for metadata is full. In an embodiment, if metadata management program 112 determines that the space allocated in the host cache for metadata is not full ("no" branch, decision block 608), then metadata management program 112 proceeds to step 612 to save the metadata in the host cache. In an embodiment, if metadata management program 112 determines that the space allocated in the host cache for metadata is full ("yes" branch, decision block 608), then metadata management program 112 proceeds to step 610 to clear space in the cache for the new metadata.

Metadata management program 112 discards the metadata from the host cache based on LRU (step 610). In an embodiment, metadata management program 112 discards existing metadata from the host cache using the LRU algorithm to create space for the new metadata.

Metadata management program 112 saves the new metadata in the host cache (step 612). In an embodiment, metadata management program 112 saves the new metadata in the host cache. In an embodiment, metadata management program 112 then ends for this cycle.

Figure 7:
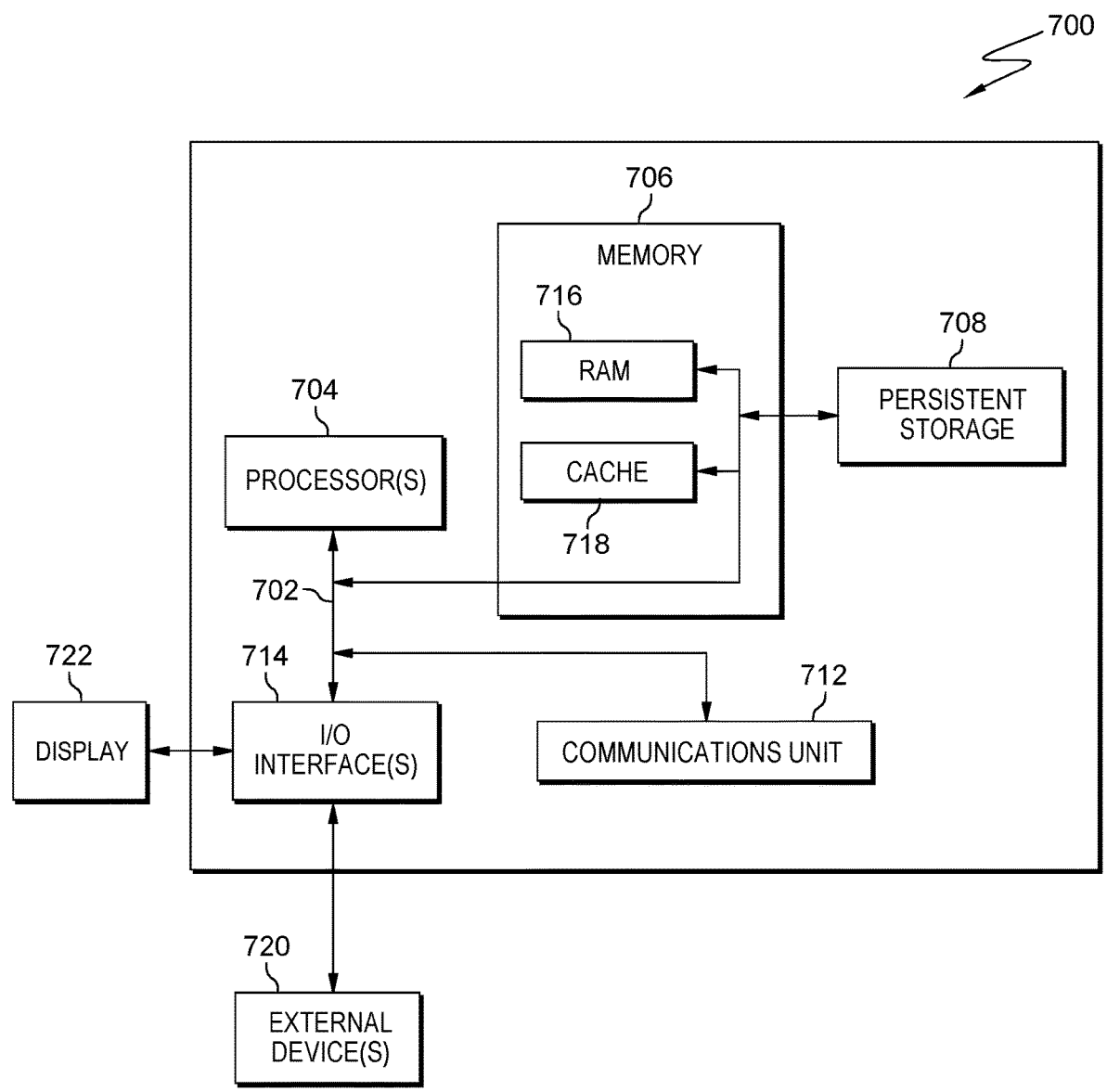
FIG. 7 depicts a block diagram of components of the computing devices executing the metadata management program within the distributed data processing environment of FIG. 1, in accordance with an embodiment of the present invention.

FIG. 7 is a block diagram depicting components of computing device 110 suitable for metadata management program 112, in accordance with at least one embodiment of the invention. FIG. 7 displays computer 700; one or more processor(s) 704 (including one or more computer processors); communications fabric 702; memory 706, including random-access memory (RAM) 716 and cache 718; persistent storage 708; communications unit 712; I/O interfaces 714; display 722; and external devices 720. It should be appreciated that FIG. 7 provides only an illustration of one embodiment and does not imply any limitations with regard to the environments in which different embodiments may be implemented. Many modifications to the depicted environment may be made.

As depicted, computer 700 operates over communications fabric 702, which provides communications between computer processor(s) 704, memory 706, persistent storage 708, communications unit 712, and I/O interface(s) 714. Communications fabric 702 may be implemented with any architecture suitable for passing data or control information between processors 704 (e.g., microprocessors, communications processors, and network processors), memory 706, external devices 720, and any other hardware components within a system. For example, communications fabric 702 may be implemented with one or more buses.

Memory 706 and persistent storage 708 are computer readable storage media. In the depicted embodiment, memory 706 comprises RAM 716 and cache 718. In general, memory 706 can include any suitable volatile or non-volatile computer readable storage media. Cache 718 is a fast memory that enhances the performance of processor(s) 704 by holding recently accessed data, and near recently accessed data, from RAM 716.

Program instructions for metadata management program 112 may be stored in persistent storage 708, or more generally, any computer readable storage media, for execution by one or more of the respective computer processors 704 via one or more memories of memory 706. Persistent storage 708 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links. In the context of some embodiments of the present invention, the source of the various input data may be physically remote to computer 700 such that the input data may be received, and the output similarly transmitted via communications unit 712.

I/O interface(s) 714 allows for input and output of data with other devices that may be connected to computer 700. For example, I/O interface(s) 714 may provide a connection to external device(s) 720 such as a keyboard, a keypad, a touch screen, a microphone, a digital camera, and/or some other suitable input device. External device(s) 720 can also include portable computer readable storage media such as, for example, thumb drives, portable optical or magnetic disks, and memory cards. Software and data used to practice embodiments of the present invention, e.g., metadata management program 112, can be stored on such portable computer readable storage media and can be loaded onto persistent storage 708 via I/O interface(s) 714. I/O interface(s) 714 also connect to display 722.

Display 722 provides a mechanism to display data to a user and may be, for example, a computer monitor. Display 722 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    initializing, by one or more computer processors, a cache for a storage system;
    responsive to receiving a cache hit from a host cache during a host I/O operation, transferring, by the one or more computer processors, a first metadata of a plurality of metadata to a storage cache, wherein the first metadata is associated with a user data from the host I/O operation, and further wherein the first metadata is deleted from the host cache; and
    responsive to determining that the storage cache is full, destaging, by the one or more computer processors, a second metadata of the plurality of metadata from the storage cache, wherein the second metadata is destaged by moving the second metadata to the host cache, and further wherein the second metadata is deleted from the storage cache.

2. The computer-implemented method of claim 1, wherein initializing the cache for the storage system comprises:
    responsive to initializing the storage system, preloading, by the one or more computer processors, a third metadata of the plurality of metadata to the storage cache, wherein the third metadata is from one or more storage volumes with a high Quality of Service (QoS); and
    responsive to a host attaching to the storage system, preloading, by the one or more computer processors, a fourth metadata of the plurality of metadata from one or more storage tiers into the host cache, wherein the fourth metadata is preloaded from a top storage tier to one or more lower storage tiers based on an allocated metadata capacity of the host cache.

3. The computer-implemented method of claim 2, further comprising:
    storing, by the one or more computer processors, on the top storage tier, a fifth metadata of the plurality of metadata associated with hot user data that is stored on the top storage tier, wherein the hot user data is determined using machine learning;
    promoting, by the one or more computer processors, a sixth metadata of the plurality of metadata to the top storage tier, wherein all the user data associated with the sixth metadata is stored on the top storage tier;
    prioritizing, by the one or more computer processors, a hot metadata, a warm metadata, and a cold metadata, wherein a priority is determined using the machine learning, and further wherein the hot metadata is highest priority, the warm metadata is medium priority, and the cold metadata is low priority; and
    exchanging, by the one or more computer processors, the hot metadata, the warm metadata, and the cold metadata between the one or more storage tiers, wherein the hot metadata is exchanged to the top storage tier, the warm metadata is exchanged to a middle storage tier, and the cold metadata is exchanged to a bottom storage tier.

4. The computer-implemented method of claim 1, wherein responsive to determining that the storage cache is full, destaging, by the one or more computer processors, the second metadata of the plurality of metadata from the storage cache, wherein the second metadata is destaged by moving the second metadata to the host cache, and further wherein the second metadata is deleted from the storage cache further comprises:

selecting, by the one or more computer processors, the second metadata using a Least Recently Used (LRU) algorithm.

5. The computer-implemented method of claim 1, wherein the host cache is a plurality of host caches on a plurality of hosts.

6. The computer-implemented method of claim 1, further comprising a metadata management module, wherein the metadata management module maps a track index of the user data to the plurality of metadata.

7. The computer-implemented method of claim 1, wherein the first metadata of the plurality of metadata and the second metadata of the plurality of metadata are not stored in a same cache.

8. A computer program product comprising one or more computer readable storage media and program instructions stored on the one or more computer readable storage media, the program instructions including instructions to:

initialize a cache for a storage system;

responsive to receiving a cache hit from a host cache during a host I/O operation, transfer a first metadata of a plurality of metadata to a storage cache, wherein the first metadata is associated with a user data from the host I/O operation, and further wherein the first metadata is deleted from the host cache; and responsive to determining that the storage cache is full, destage a second metadata of the plurality of metadata from the storage cache, wherein the second metadata is destaged by moving the second metadata to the host cache, and further wherein the second metadata is deleted from the storage cache.

9. The computer program product of claim 8, wherein initialize the cache for the storage system comprises one or more of the following program instructions, stored on the one or more computer readable storage media, to:

responsive to initializing the storage system, preload a third metadata of the plurality of metadata to the storage cache, wherein the third metadata is from one or more storage volumes with a high Quality of Service (QoS); and responsive to a host attaching to the storage system, preload a fourth metadata of the plurality of metadata from one or more storage tiers into the host cache, wherein the fourth metadata is preloaded from a top storage tier to one or more lower storage tiers based on an allocated metadata capacity of the host cache.

10. The computer program product of claim 9, further comprising one or more of the following program instructions, stored on the one or more computer readable storage media, to:

store on the top storage tier, a fifth metadata of the plurality of metadata associated with hot user data that is stored on the top storage tier, wherein the hot user data is determined using machine learning;

promote a sixth metadata of the plurality of metadata to the top storage tier, wherein all the user data associated with the sixth metadata is stored on the top storage tier;

prioritize a hot metadata, a warm metadata, and a cold metadata, wherein a priority is determined using the machine learning, and further wherein the hot metadata is highest priority, the warm metadata is medium priority, and the cold metadata is low priority; and exchange the hot metadata, the warm metadata, and the cold metadata between the one or more storage tiers, wherein the hot metadata is exchanged to the top storage tier, the warm metadata is exchanged to a middle storage tier, and the cold metadata is exchanged to a bottom storage tier.

11. The computer program product of claim 8, wherein responsive to determining that the storage cache is full, destage the second metadata of the plurality of metadata from the storage cache, wherein the second metadata is destaged by moving the second metadata to the host cache, and further wherein the second metadata is deleted from the storage cache further comprises one or more of the following program instructions, stored on the one or more computer readable storage media, to:

select the second metadata using a Least Recently Used (LRU) algorithm.

12. The computer program product of claim 8, wherein the host cache is a plurality of host caches on a plurality of hosts.

13. The computer program product of claim 8, further comprising a metadata management module, wherein the metadata management module maps a track index of the user data to the plurality of metadata.

14. The computer program product of claim 8, wherein the first metadata of the plurality of metadata and the second metadata of the plurality of metadata are not stored in a same cache.

15. A computer system comprising:

one or more computer processors;

one or more computer readable storage media; and program instructions stored on the one or more computer readable storage media for execution by at least one of the one or more computer processors, the stored program instructions including instructions to:

initialize a cache for a storage system;

responsive to receiving a cache hit from a host cache during a host I/O operation, transfer a first metadata of a plurality of metadata to a storage cache, wherein the first metadata is associated with a user data from the host I/O operation, and further wherein the first metadata is deleted from the host cache; and responsive to determining that the storage cache is full, destage a second metadata of the plurality of metadata from the storage cache, wherein the second metadata is destaged by moving the second metadata to the host cache, and further wherein the second metadata is deleted from the storage cache.

16. The computer system of claim 15, wherein initialize the cache for the storage system comprises one or more of the following program instructions, stored on the one or more computer readable storage media, to:

responsive to initializing the storage system, preload a third metadata of the plurality of metadata to the storage cache, wherein the third metadata is from one or more storage volumes with a high Quality of Service (QoS); and responsive to a host attaching to the storage system, preload a fourth metadata of the plurality of metadata from one or more storage tiers into the host cache, wherein the fourth metadata is preloaded from a top storage tier to one or more lower storage tiers based on an allocated metadata capacity of the host cache.

17. The computer system of claim 16, further comprising one or more of the following program instructions, stored on the one or more computer readable storage media, to:

store on the top storage tier, a fifth metadata of the plurality of metadata associated with hot user data that is stored on the top storage tier, wherein the hot user data is determined using machine learning;

promote a sixth metadata of the plurality of metadata to the top storage tier, wherein all the user data associated with the sixth metadata is stored on the top storage tier;

prioritize a hot metadata, a warm metadata, and a cold metadata, wherein a priority is determined using the machine learning, and further wherein the hot metadata is highest priority, the warm metadata is medium priority, and the cold metadata is low priority; and exchange the hot metadata, the warm metadata, and the cold metadata between the one or more storage tiers, wherein the hot metadata is exchanged to the top storage tier, the warm metadata is exchanged to a middle storage tier, and the cold metadata is exchanged to a bottom storage tier.

18. The computer system of claim 15, wherein responsive to determining that the storage cache is full, destage the second metadata of the plurality of metadata from the storage cache, wherein the second metadata is destaged by moving the second metadata to the host cache, and further wherein the second metadata is deleted from the storage cache further comprises one or more of the following program instructions, stored on the one or more computer readable storage media, to:

select the second metadata using a Least Recently Used (LRU) algorithm.

19. The computer system of claim 15, further comprising a metadata management module, wherein the metadata management module maps a track index of the user data to the plurality of metadata.

20. The computer system of claim 15, wherein the first metadata of the plurality of metadata and the second metadata of the plurality of metadata are not stored in a same cache.

\* \* \* \* \*